March 10, 1970     J. S. FRASER     3,500,098

INTENSE NEUTRON GENERATOR

Filed Oct. 22, 1965

3,500,098
INTENSE NEUTRON GENERATOR
John S. Fraser, Deep River, Ontario, Canada, assignor to Atomic Energy of Canada Limited, Ottawa, Ontario, Canada, a corporation of Canada
Filed Oct. 22, 1965, Ser. No. 501,623
Int. Cl. H01j *39/32*
U.S. Cl. 313—61                                  5 Claims

ABSTRACT OF THE DISCLOSURE

An intense neutron generator including a beam tube with an end opening into a target area of liquid metal. A stream of protons is directed against the liquid metal causing a nuclear cascade and producing a high neutron flux. The liquid metal flows past the open end of the beam tube to create a cavitation bubble and form a windowless vacuum seal. The liquid metal is also circulated through a heat exchanger to reject heat generated during proton bombardment. The preferred liquid metal is a lead bismuth alloy and the most preferred is the eutectic.

---

Figure 1:
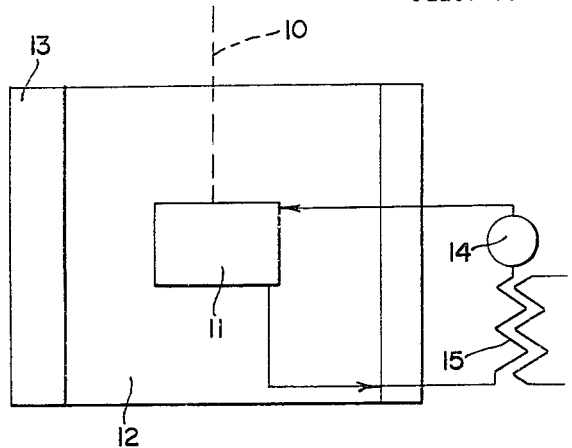

The present invention relates to apparatus for producing extremely high neutron fluxes, and in particular to present invention relates to a target which may be irradiated with a high power proton beam to generate this extremely high neutron flux. The target of the present invention is suitable for use with proton beams having a beam current of up to 100 ma. and accelerated to 1G ev. ($10^9$ electron volts) by controlled electromagnetic fields. The total energy of this proton beam will be of the order of 60 megawatts of which approximately 35 megawatts will be removed as heat generated in the target against which the protons are projected.

In accordance with one aspect of the invention, protons are accelerated by controlled electromagnetic fields and steered by precise magnetic fields to strike a flowing liquid lead-bismuth eutectic target, thus causing a nuclear cascade producing a neutron source of the order of $10^{19}$ neutrons per second.

The high energy protons used to irradiate the target of the present invention will be generated in apparatus which is evacuated to a vacuum of about $10^{-6}$ torr. The proton beam will then be projected down a beam-tube and into the target. The target itself is not contained in a vacuum and some means must be found for maintaining the integrity of the vacuum in which the proton beam is generated until the beam reaches the target. One possible solution of this problem would be to provide a window made of a material relatively transparent to protons. A possible material for this window would be beryllium, however radiation damage at this window will be most severe and will be caused by the neutron flux from the target and the proton beam. Neutron irradiation of beryllium and stainless steel will increase the ultimate tensile strength, reduce ductility and may cause a volume increase in beryllium. Induced interstitial and vacancy loops, and helium produced by transmutation of beryllium will likely cause these changes. As the helium content in the beryllium increases mechanical failure of the vacuum seal window would result. Additionally for a 60 megawatt beam, the heat deposition in a window would vary from 19 kw. per mm. of thickness for beryllium to 72 kw. per mm. for iron. The corrosion and cooling problems could be eased by placing the window outside the target assembly and puressurizing the space between the window and the liquid metal target with an inert gas. However, the heat deposition in a 2 meter column of argon at 30 p.s.i.a. would be 42 kw., and for helium, 3.6 kw. It is clear that the window itself would also have to be cooled and the radiation absorbed by the coolant would further increase the heating of the window and the energy loss therethrough. The pressurizing gas would have to be replaced continuously to make up for the loss by entrainment in the flowing liquid metal.

The foregoing problems are all avoided by providing a target constructed in accordance with the present invention in which the target is formed from a liquid eutectic of lead and bismuth, which is also used for heat transport from the target and in which the flow of the liquid metal is so arranged in relation to the beam tube that a cavitation bubble is formed at the end of the beam tube maintaining the vacuum seal without a window being required in the beam tube.

In contrast to a structure using a window, the structure of the present invention provides a clear and unobstructed path for the proton beam to the target, provides a target capable of withstanding the intense heat generated during irradiation provides a workable heat transport fluid for conducting heat away from the target zone and further provides a windowless vacuum seal for the proton beam tube.

Figure 2:
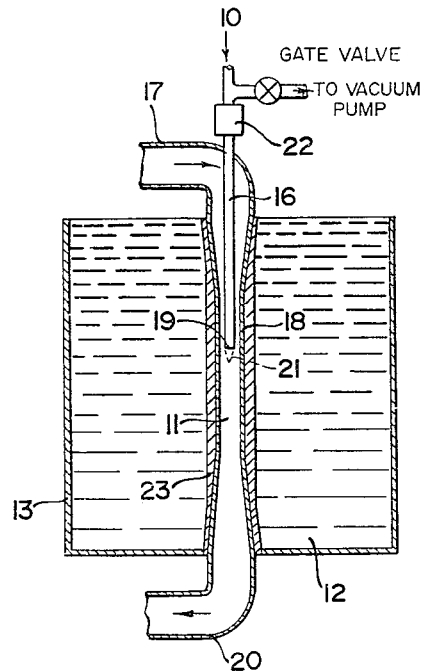
Figure 3A:
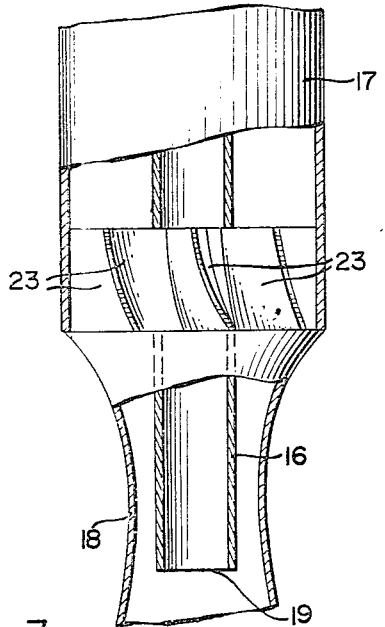
Figure 3B:
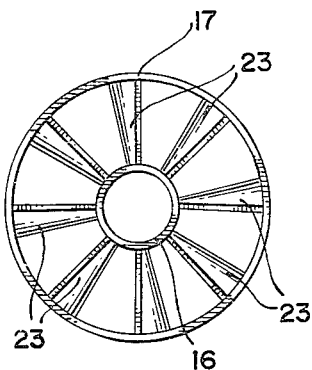

These and other features and advantages of the present invention will become more clear from a consideration of the following description in relation to the accompanying drawings in which:

FIGURE 1 is a schematic diagram of an intense neutron generator constructed in accordance with the present invention, FIGURE 2 is a simplified diagram of the proton beam and target system used in the neutron generator constructed in accordance with the teachings of the present invention, and FIGURES 3A and 3B illustrate a modified form of structure for the beam-tube and coolant-target fluid flow.

Referring to FIGURE 1, a proton beam 10 is projected in a target 11, surrounded by a moderator 12, such as heavy water, which is enclosed in a shield 13. A pump 14 pumps a heat exchange fluid from the target 11 to a heat exchanger 15 and back to the target 11. Thus heat generated in the target during operation is conducted away from the target by a conventional heat-transfer heat exchanger structure. In operation of an intense neutron generator the beam 10 of protons irradiates the target and produces an intense neutron flux and heat in the target 11. The intense neutron flux may be led out through the moderator 12 by means of beam holes (not shown) and the heat is removed from the target by having a heat-exchange fluid passed through the heat-exchanger 15.

Referring to FIGURE 2, there is shown a structure constructed in accordance with the present invention for the production of an intense neutron flux. As before a proton beam 10 is accelerated along a beam tube 16 into a target 11, and produces an intense neutron flux as well as other radiations including heat. In accordance with the present invention the target consists of a liquid lead-bismuth alloy which also constitutes the working fluid for the heat-exchange cycle. The lead-bismuth alloy chosen may have any particular composition desired, however it will be appreciated that the eutectic has the lowest melting point and accordingly appears most desirable for use in the present invention. The liquid lead-bismuth eutectic enters the target area by means of the tube 17 and flows downwardly through the narrowed portion 18 of the tube 17, and past the open end 19 of the beam-tube 16. The liquid lead-bismuth alloy is then subject to the proton beam 10 in the target area 11, where it becomes intensely heated and is drawn out through the lower portion 20 of the tube 17. The liquid lead-bismuth alloy is considerably heated during its passage through the target area and this heat is then extracted by means of a heat-exchanger and the liquid lead-bismuth alloy is then recycled through the target area. As shown in FIGURE 2, in accordance with the present invention, a cavitation bubble 21 is formed at the free end 19 of the beam-tube 16, which cavitation bubble effectively seals the free end of the beam-tube 16, thus maintaining the integrity of the vacuum of the proton beam generating system. Thus the rapidly flowing target liquid streams through a constricted portion 18 of the tube 17 and produces a very low vacuum and consequently a cavitation bubble 21 at the free end 19 of the beam-tube 16. In this way the vacuum is maintained without a window and without all the inherent disadvantages and problems attendant on the use of a vacuum window. Thus for a neutron generator with a proton beam energy of 65 megawatts, about 37 megawatts is deposited in the lead-bismuth target by ionization processes. The neutrons constitute about 15 megawatts as kinetic energy, a large fraction of which is trapped in the moderator 12, which typically is of heavy water. The remaining 13 megawatts of energy will appear as gamma radiation in the target, moderator and shielding 13.

Considering only the heat in the target 11, a temperature rise of approximately 250° C. can be tolerated in the target. Accordingly a mass flow of about 1 ton per second is required through the target area 11. FIGURE 2 illustrates the axial flow geometry of apparatus suitable for use with an intense neutron generator. This particular axial flow arrangement is attractive for numerous reasons. Firstly, the target material displaces a minimum of the moderator. The axial symmetry gives maximum flexibility in the placement of neutron beam tubes and irradiation facilities. The proton beam tube 16 is mounted coaxially with the liquid-metal pipe 17 and the flow rate is made high enough that cavitation is induced at the end 19 of the beam tube 16. Fortunately the vapor pressures of both lead and bismuth at the temperatures involved are of the order of $10^{-7}$ torr. Cavitations is established and the system functions as an aspirator or jet pump so that the beam tube window becomes superfluous. Back-streaming of metal vapor can be stopped by refrigerating the walls of the beam tube with a cold trap 22. Another advantage for the system is that the hottest region of the ectectic is not in contact with the beam tube 17. The temperature of the liquid in contact with the pipe 20 will be close to the bulk temperature of the target material after absorbing the beam energy.

FIGURES 3A and 3B illustrate a further form of tube 17 and beam tube 16 which may be used in accordance with the present invention. The principal difference between this form of tube 17 and the one illustrated in FIGURE 2 is that a plurality of vanes 23 are arranged about the beam tube 16 and within the tube 17, and are so positioned as to cause the liquid lead-bismuth alloy to rotate about the end of the beam tube 16 and through the portion 18 of the tube 17, thus creating a rotating flow at the end 19 of the beam tube 16 which tends to improve the stability of the cavitation bubble 21.

It has thus been shown that the present invention provides a new and improved structure for an intense neutron generator and includes an improved target consisting of liquid lead-bismuth alloy, which target is formed by a flow of a liquid lead-bismuth alloy coaxially with the beam tube of the proton generator thus forming a cavitation bubble at the free end of the beam tube and avoiding the use and concomitant disadvantages of a vacuum seal proton transparent window.

I claim:
1. An intense neutron generator comprising a beam tube through which a high energy beam of protons may stream, said beam tube having a vacuum therein and an open end extending into a target area, a liquid metal in said target area which when irradiated by said beam emits neutrons, means to circulate said liquid metal past the end of said beam tube in such a direction as to form a cavitation bubble at the end of said beam tube to maintain said vacuum, and a heat exchanger to which said liquid metal is also circulated, the heat generated in said target area being rejected from said liquid metal in said heat exchanger.

2. A generator according to claim 1 wherein said liquid metal is a lead-bismuth alloy.

3. A generator according to claim 2 wherein said alloy is the eutectic.

4. A target for an intense neutron generator having an open ended beam tube and formed from a liquid alloy of lead and bismuth, said liquid alloy also being used as a heat transfer fluid for removing heat from the target, the flow of said liquid alloy being arranged in relation to the beam tube that a cavitation bubble is formed at the open end of the beam tube causing the formation of a windowless vacuum seal for said beam tube.

5. A target for an intense neutron generator according to claim 4 wherein said liquid alloy is the eutectic.

No references cited.

JAMES W. LAWRENCE, Primary Examiner
R. F. HOSSFELD, Assistant Examiner

U.S. Cl. X.R.
250—84.5; 313—12, 63, 163